United States Patent [19]
Baresel et al.

[11] 3,902,917
[45] Sept. 2, 1975

[54] PROCESS FOR THE PRODUCTION OF TUNGSTEN CARBIDE CATALYST ADAPTED FOR USE IN FUEL CELLS

[75] Inventors: Detlef Baresel, Stuttgart; Winfried Gellert, Ludwigsburg; Peter Scharner, Gebersheim, all of Germany

[73] Assignee: Robert Bosch G.m.b.H., Stuttgart, Germany

[22] Filed: Aug. 30, 1973

[21] Appl. No.: 393,145

Related U.S. Application Data

[63] Continuation of Ser. No. 149,986, June 1, 1971, Pat. No. 3,801,177.

[30] Foreign Application Priority Data

June 4, 1970  Germany............................ 2027472
Dec. 23, 1970  Germany............................ 2063350

[52] U.S. Cl............ 136/86 D; 136/120 FC; 423/440
[51] Int. Cl. ......................................... H01m 27/04
[58] Field of Search .... 136/86 D, 120 FC; 423/440, 423/606

[56]  References Cited
UNITED STATES PATENTS

| | | | |
|---|---|---|---|
| 1,972,136 | 9/1934 | Driggs................................. | 423/606 |
| 2,993,755 | 7/1961 | Redanz............................... | 423/606 |
| 3,077,385 | 2/1963 | Robb................................... | 423/440 |
| 3,516,784 | 6/1970 | Dadd................................... | 423/606 |

*Primary Examiner*—John H. Mack
*Assistant Examiner*—H. A. Feeley
*Attorney, Agent, or Firm*—Michael S. Striker

[57]  ABSTRACT

Processes of preparing tungsten carbide catalysts adapted for use in making electrodes for use in electrochemical fuel cells for the direct production of electrical energy by oxidation of hydrogen, formaldehyde, or formic acid, in which a precipitated tungstic acid hydrate is freeze-dried, heated to expel the water of crystallization and the water formed by dehydration of the tungstic acid and the resulting tungsten trioxide is then reacted with carbon monoxide or a hydrocarbon at a temperature between 600° and 700°C to convert it to an active tungsten carbide catalyst.

6 Claims, No Drawings

PROCESS FOR THE PRODUCTION OF TUNGSTEN CARBIDE CATALYST ADAPTED FOR USE IN FUEL CELLS

REFERENCE TO RELATED APPLICATION

This application is a continuation in part of our prior copending application Ser. No. 149,986, filed June 1, 1971, now U.S. Pat. No. 3,801,177, entitled "Fuel Electrodes and Process of Preparing the Same".

BACKGROUND OF THE INVENTION

The present invention pertains to processes for producing catalysts that are adapted for direct use in making electrodes for use in electrochemical fuel cells, particularly those in which the electrolyte is an acidic solution.

Catalysts for this purpose consisting of carbides of the transition elements, including tungsten carbide, have heretofore been described and their use in fuel cells for converting hydrocarbons and similar inexpensive fuels into electrical energy have been proposed. However, the current densities obtained in fuel cells with electrodes comprising these catalysts is so low that their use is not economical. For example, when such catalysts are used with fuels such as hydrogen ($H_2$), formaldehyde (HCHO), and formic acid (HCOOH) in fuel cells comprising an electrolyte consisting of sulfuric acid at an electrical potential of 250 millivolts and a temperature of 70°C, the following current densities in milliamperes per gram of catalyst were obtained:

| | |
|---|---|
| $H_2$ | 100 milliamperes/gram |
| HCHO | 40 milliamperes/gram |
| HCOOH | 1 milliampere/gram |

These relatively low current densities are probably attributable to the sintering process to which the electrodes are subjected during their production. In one such process, the metal and carbon are sintered together at temperatures of at least 600°C. In another such process, the metal carbide is made by a gas-phase reaction of a metal halide with a hydrocarbon and hydrogen and the resulting metal carbide is subjected to a sintering treatment at temperatures above 600°C. In such phase processes, because of the temperatures required for sintering, relatively inactive catalysts are invariably produced. A great portion of the active centers on the surface of the electrode are thus deactivated. It is accordingly necessary to reactivate electrodes thus produced by an anodic or cathodic treatment during which metallic portions or oxide layers that are present on the electrodes are dissolved in the electrolyte and new active centers are thus created.

SUMMARY OF THE INVENTION

It is an object of the present invention to provide processes of producing catalysts that are eminently adapted for the electrochemical conversion of inexpensive fuels such as hydrogen, formaldehyde, and formic acid into electrical energy.

Another object of the present invention is to provide an economically feasible method of preparing such catalysts.

Still another object of the invention is to provide electrodes and processes for producing electrodes comprising such catalysts which are characterized by their high mechanical strength and relatively small dimensions, that is, so-called thin electrodes.

In the electrochemical oxidation of formaldehyde in acid solution to carbon dioxide, which is expelled as a gas from the electrolyte, the reaction occurs in two stages that may be represented as follows:

$$HCHO + H_2O \rightarrow HCOOH + 2H^+ 2H^+ + 2e^- \quad (1)$$

$$HCOOH \rightarrow CO_2 + 2H^+ + 2e^- \quad (2)$$

The summation of both these stages is:
$$HCHO + H_2O \rightarrow CO_2 + 4H^+ + 4e^- \quad (3)$$

It thus is evident, if the two reactions 1 and 2 could be hastened so as to correspond to equation 3, which could be achieved by use of a catalyst that catalyzes both reactions according to equations 1 and 2, the greatest current density could thereby be attained and the electrolyte would be less likely to become overloaded with formic acid. When the electrolyte becomes overloaded with formic acid it normally is necessary to replace the electrolyte. Since the oxidations of hydrogen and formic acid, however, proceed in one stage only, no such considerations apply with respect to oxidation of those fuels.

The tungsten carbide catalysts that are prepared in accordance with the present invention can be used to provide improved electrodes for use in the electrochemical conversion of hydrogen, formaldehyde, and formic acid. These electrodes, at a potential of 250 millivolts and a temperature of 70°C have a minimum activity for formaldehyde ($i_{HCHO}$), determined in the conventional manner using an electrolytic half-cell arrangement and a hydrogen reference electrode, of 150 milliamperes per gram and a minimum activity for conversion of formic acid ($i_{HCOOH}$) of 50 milliamperes per gram, thereby permitting the simultaneous conversion of formaldehyde and formic acid substantially in accordance with equation 3 hereinbefore.

The processes of the present invention, in accordance with which improved tungsten carbide catalysts are produced, comprises precipitating tungsten acid hydrate by addition of hydrochloric acid to a solution of metal tungstate such as ammonium tungstate, freeze-drying the precipitate, thereafter heating the precipitate to expel its water of crystallization and the water formed by dehydration of the tungstic acid and form tungsten trioxide, and subsequently passing carbon monoxide or a hydrocarbon, e.g. propane, into contact with the tungsten trioxide while it is maintained at a temperature between 600° and 700°C until substantially all the tungsten trioxide is converted to tungsten carbide. The catalyst produced in accordance with this process has a large specific surface, that is, a large ratio of surface area to weight, of the order of more than one square meter per gram, as well as a great number of reactive sites.

DETAILED DESCRIPTION

The process of the present invention for producing the improved tungsten carbide catalysts consists of several steps which are exemplified as follows:

a. Hydrochloric acid is added to an aqueous solution of a water-soluble tungstate such as results from dissolving commercial tungstic acid ($H_2WO_4$) or tungsten trioxide ($WO_3$) in aqueous solutions of ammonium hydroxide, sodium hydroxide or other alkali-metal hydroxides.

A preferred solution for this purpose is that prepared by dissolving tungstic acid in concentrated ammonium hydroxide solution with the aid of heat and vigorous stirring.

To the solution of ammonium tungstate, which already is at, or is cooled to, a temperature between 0° and 25°C, concentrated hydrochloric acid is then added with vigorous stirring until the solution is acid and no futher precipitate is formed. The solution is decanted from the resulting precipitate and the precipitate is washed several times with distilled water, the wash water being drawn off each time by decantation and replaced by fresh distilled water.

b. The washed precipitate of tungsten acid hydrate ($H_2WO_4 \cdot H_2O$) is freeze-dried or lyophilized, that is, dried in a frozen state under high vacuum so that the ice sublimes rapidly and a porous bright yellow or white solid remains.

c. The freeze-dried tungstic acid hydrate is heated in air to a temperature up to 200°C so that all water of crystallization and water formed by dehydration of $H_2WO_4$ is expelled and a fine powder of tungsten trioxide remains.

d. The tungsten trioxide that is thus produced is then heated to a temperature between 600° and 700°C while a stream of carbon monoxide or a hydrocarbon, e.g. propane, is passed thereover for such a period that substantially all of the tungsten trioxide is converted to tungsten carbide.

In the first step (a) the solution of the water-soluble tungstate can be applied directly to a porous support or carrier material such as a porous carbon paper, carbon felt, carbon web, or carbon ribbon or a molecular sieve, which is to serve as the support or substrate for the catalytic tungsten carbide that is to be used as an element of a fuel-cell electrode. The solution can be applied directly to the porous carrier material by spraying or brushing but preferably is applied by impregnation, that is, by immersing or soaking the carrier material in the solution.

The hydrochloric acid is then applied to the carrier material thus impregnated or coated with the solution of the water-soluble tungstate either by spraying the carrier material therewith or by immersing or soaking the carrier material in the hydrochloric acid. The carrier material thus treated, which now includes precipitated tungstic acid hydrate, is then subjected to the remaining successive steps of the process, namely, freeze-drying (step b), heating to expel water of crystallization and water formed by dehydration of $H_2WO_4$ (step c) and heating to between 600° and 700°C while passing a stream of carbon monoxide or a hydrocarbon gas thereover (step d) in the same manner as was described hereinbefore in connection with the precipitated tungstic acid and as is further illustrated in the Examples which follow hereinafter.

Alternately an aqueous suspension of the precipitated tungstic acid hydrate from the second step (b) can be applied to the carrier material and thus-treated carrier material then be subjected to the remaining successive steps of the process The carrier materials that are to be used for the production of thin electrodes, namely, porous carbon papers, carbon felts, carbon webs, and carbon ribbons, as well as molecular sieves, especially molecular sieves of carbon, generally have a thickness between 0.1 and 1.0 millimeter and preferably a thickness between 0.1 and 0.4 millimeter. Other carbon substrates having the specified shapes and sizes can also be used, such a substrates formed by pyrolysis of organic compounds, and porous discs formed by metallization process in which a metal carbide is chlorinated and the volatile metal chloride that is thus formed is expelled, leaving the carbon adhering to the unconverted metal carbide. Organic and inorganic ion-exchange materials which do not contain carbon may also be used as a carrier material.

Electrodes for fuel cells can also be prepared from the tungsten carbide catalysts of the present invention by compressing together a mixture of the finely divided tungsten carbide powder and another substance such as ammonium carbamate, to form a tablet and leaching out the ammonium carbamate from the tablet with water.

The processes of the present invention are further described in connection with the Examples that follow.

EXAMPLE 1

A solution of ammonium tungstate was prepared by adding with vigorous stirring 50 grams of tungstic acid ($H_2WO_4$) to 100 milliliters of warm ammonium hydroxide solution (containing 25% $NH_3$ by weight) that was diluted with 100 milliliters of water and the stirring and heating of the mixture was continued until the tungstic acid was completely dissovled. To this solution, concentrated hydrochloric acid (37% HCl by weight) was added with vigorous stirring while the solution was maintained at a temperature between 0° and 25°C until no further precipitation occurred. The precipitate was allowed to settle and the supernatant liquid decanted therefrom. The resulting precipitate was then washed several times with distilled water by adding water to the precipitate and stirring the precipitate therein, allowing the precipitate to settle, and again decanting the supernatant liquid. Subsequently the precipitated tungstic acid hydrate was freeze-dried and recovered as dry bright yellow or white powder. This dry powder was then heated to a temperature of 200°C in air for such a period as to expel the water of crystallization and the water formed by dehydration of $H_2WO_4$ therefrom and leave a finely divided tungsten trioxide ($WO_3$). The tungsten trioxide thus prepared was placed in a quartz tube which was heated in a muffle furnace at a temperature of 700°C while a stream of carbon monoxide was passed through the tube into contact with the tungsten trioxide therein. After a period of between 4 and 5 hours the tungsten carbide thus formed was permitted to cool and a portion thereof was applied to a graphite felt and used as an electrode in a fuel cell.

Tungsten carbide powder prepared in this manner may be pyrophoric, that is, may burn spontaneously in air.

An electrode was made from 0.966 gram of the tungsten carbide powder that was prepared in this Example, the particles of which had a size of less than 60 microns. This powder was then thoroughly mixed with 0.034 gram of ammonium carbamate powder, the particles of which had been ground to the same size, and the mixture was compressed in a mold at a pressure of 18 metric tons per square centimeter to form a tablet having a diameter of 15 millimeters and a thickness of 0.5 millimeter. The ammonium carbamate was then leached from the tablet with warm water and a gold wire was inserted thereinto to serve as a conductor.

The activity of the electrode thus prepared was then determined using a half-cell arrangement as described hereinafter.

EXAMPLE 2

A tablet having the diameter of 15 millimeters and a thickness of 3 millimeters was prepared by compressing 1.82 grams of tungsten trioxide powder prepared as described in Example 1 in a mold at a pressure of 1 metric ton per square centimeter. The tablet was thereafter placed in a quartz tube in a muffle furnace in which is was heated at a temperature of 700°C for 6 hours while a stream of carbon monoxide gas was passed through the tube. After cooling, the tube was flushed with argon gas and the tablet of tungsten carbide that was thus produced while still blanketed with argon was then soaked in 10 millimeters of distilled water and its activity was determined as described hereinafter.

EXAMPLE 3

A tablet of tungsten carbide was prepared exactly as described in Example 2 hereinbefore, but instead of impregnating the electrode with distilled water as described in that Example, it was soaked in 10 milliliters of an electrolyte-fuel mixture containing sulfuric acid and formaldehyde in the proportion of 1.5 mols of $H_2SO_4$ to 6 mols pf HCHO per liter of the mixture.

ACTIVITIES OF ELECTRODES OF EXAMPLES 1 TO 3

Using the conventional half-cell method, the activities of each of the electrodes prepared in the foregoing examples for converting hydrogen, formaldehyde, and formic acid directly into electrical energy were determined at a potential of 250 millivolts and a temperature of 70°C and the results are listed in milliamperes per gram in the Table which follows. The specific surfaces of the electrodes as determined by the standard BET (Brunauer, Emmett and Teller, Journal of the American Chemical Society, vol. 60, page 309) method in square meters per gram are also included in this Table. In the last column headed "Maximum" is included the maximum activity that has been observed for electrodes of tungsten carbide of this type at a potential of 250 millivolts and a temperature of 70°C.

TABLE

| Example | 1 | 2 | 3 | Maximum |
|---|---|---|---|---|
| Specific surface, square meters/gram | 18 | 17 | 20 | |
| Activity ($i_{H2}$), milliamperes/gram | 300 | 380 | 410 | 600 |
| Activity ($i_{HCHO}$), milliamperes/gram | 174 | 298 | 307 | 780 |
| Activity ($i_{HCOOH}$), milliamperes/gram | 18 | 54 | 100 | 180 |

EXAMPLE 4

A carbon web having a thickness of 0.4 millimeter, and a length of 4 centimeters and a width of 4 centimeters was saturated with a concentrated ammonium tungstate solution and then immersed in concentrated hydrochloric acid and this procedure was repeated four times. After this treatment the coating of tungstic acid hydrate that was formed on the web has a thickness as determined from a number of samples between 40 and 100 milligrams per square centimeter. The web was then freeze-dried and then placed in a drying cabinet maintained at a temperature of 200°C for a period of about 1 hour, after which the web was placed in a quartz tube heated at a temperature of 700°C while a stream of carbon monoxide was passed through the tube for 5 hours at a rate of 20 liters per hour. In this manner, the tungstic acid hydrate on the web was completely converted to tungsten carbide.

EXAMPLE 5

A carbon web having the same length and width as the web in Example 4 but having a thickness of only 0.2 millimeter was coated with a slurry of freshly precipitated tungstic acid hydrate in distilled water that was prepared as described in Example 1. The web was then freeze-dried and heated at a temperature of 200°C for 1 hour and thereafter heated at a temperature of 700°C while a stream of carbon monoxide was passed thereover as described in Example 4, until the tungsten trioxide was completely converted into tungsten carbide.

EXAMPLE 6

A carbon web having the same dimensions as specified in Example 4 was saturated with a concentrated solution of ammonium tungstate and then sprayed with concentrated hydrochloric acid. This web was then freeze-dried at a temperature of −10°C and at an absolute pressure of 0.1 millimeter of mercury, and subsequently treated exactly as described in Example 4 until the tungstic acid hydrate had been converted to tungstic carbide.

The activities of each of the electrodes prepared from the carbon webs of Examples 4–6 for converting formaldehyde were determined by using a conventional half-cell arrangement at a potential of 350 millivolts against a hydrogen reference electrode and made at a temperature of 70°C in a 4.5-normal sulfuric acid solution were found to be about the same for each and was between 250 and 500 milliamperes per gram of tungsten carbide.

The activities of electrodes of the type described in Examples 4 and 6 for converting formic acid can be increased by soaking or wetting the electrode with distilled water or with an electrolyte-fuel mixture as described in Examples 2 and 3.

The tungsten carbide catalysts of the present invention can be used to produce thin inexpensive acid-resistant electrodes having high activities for converting inexpensive fuel by oxidation in fuel cells into electrical energy, as described herein.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the production of a tungsten carbide catalyst that is adapted for use in making electrodes for use in electrochemical fuel cells for the direct production of electrical energy by oxidation of hydrogen, formaldehyde, and formic acid which comprises the following steps:
- a. adding concentrated hydrochloric acid to a solution of a water-soluble tungstate that is maintained at a temperature between 0° and 25°C, to precipitate the tungstic acid in the form of tungstic acid hydrate,
- b. freeze-drying the thus-precipitated tungstic acid hydrate to expel adherent water and hydrochloric acid therefrom,
- c. heating the thus-dried tungstic acid hydrate in air at a temperature of approximately 200°C and for a period sufficient to expel the water of crystallization and the water formed by dehydration of the tungstic acid therefrom and form tungsten trioxide,
- d. passing carbon monoxide or a hydrocarbon into contact with the thus-formed tungsten trioxide while it is maintained at a temperature between 600 and 700°C until substantially all the tungsten trioxide is converted to tungsten carbide.

2. A process as defined in claim 1 in which the water-soluble tungstate in the first step (a) is ammonium tungstate.

3. A process as defined in claim 1 in which tungstic acid hydrate is precipitated in the first step (a) upon a porous carrier material.

4. A process as defined in claim 3 in which the carrier material is a porous carbon paper, carbon felt, carbon web or carbon ribbon.

5. A process as defined in claim 3 in which the carrier material is a molecular sieve.

6. A process as defined in claim 3 in which the carrier material is an organic or inorganic ion-exchange substance.

* * * * *